United States Patent
Fitzpatrick et al.

(10) Patent No.: US 6,907,428 B2
(45) Date of Patent: Jun. 14, 2005

(54) USER INTERFACE FOR A MULTI-DIMENSIONAL DATA STORE

(75) Inventors: Alexander Gordon Fitzpatrick, Nepean (CA); Sasan Seydnejad, Ottawa (CA)

(73) Assignee: Cognos Incorporated, Ottawa (CA)

( * ) Notice: Subject to any disclaimer, the term of this patent is extended or adjusted under 35 U.S.C. 154(b) by 355 days.

(21) Appl. No.: 10/015,984

(22) Filed: Nov. 2, 2001

(65) Prior Publication Data

US 2003/0088586 A1 May 8, 2003

(51) Int. Cl.[7] .............................................. G06F 17/30
(52) U.S. Cl. ........................... 707/10; 707/3; 707/100; 707/104.1; 709/203; 715/501.1; 715/503
(58) Field of Search ................... 707/2–5, 10, 100, 707/104.1; 709/203; 715/501.1, 503, 504, 530

(56) References Cited

U.S. PATENT DOCUMENTS

| | | | | |
|---|---|---|---|---|
| 5,237,497 A | * | 8/1993 | Sitarski ........................... | 705/8 |
| 5,893,123 A | | 4/1999 | Tuinenga | |
| 5,926,822 A | * | 7/1999 | Garman ........................ | 715/503 |
| 5,983,268 A | * | 11/1999 | Freivald et al. .............. | 709/218 |
| 6,006,239 A | * | 12/1999 | Bhansali et al. ............. | 707/201 |
| 6,282,546 B1 | | 8/2001 | Gleichauf et al. ........... | 707/102 |
| 6,539,403 B2 | * | 3/2003 | Cho et al. .................... | 707/203 |
| 6,621,505 B1 | * | 9/2003 | Beauchamp et al. ......... | 345/764 |

FOREIGN PATENT DOCUMENTS

WO  01/16808 A1  3/2001

OTHER PUBLICATIONS

BrainMatter (now called SpreadsheetBlox) by AlphaBlox, printed on Mar. 7, 2002.
Gedafe (Generic Database Front–End) from Department für Elektrotechnik, ETZ Zürich, printed Mar. 7, 2002.

* cited by examiner

*Primary Examiner*—Greta Robinson
*Assistant Examiner*—Cheryl Lewis
(74) *Attorney, Agent, or Firm*—Shumaker & Sieffert, P.A.

(57) ABSTRACT

The invention provides a means of interacting with a subset of a large amount of related information that assists in providing a user with the overall understanding necessary to execute rapid and knowledgeable decision-making. It consists of a spreadsheet-like client application which interacts with a planning data repository (PDR) and its associated computing resources. All of the data used in computing the values shown in the spreadsheet cells are derived directly from the PDR. Any changes made by the user to the displayed data are sent to the PDR and, when validated, incorporated into the overall data following a two-step process of 'calculate' and 'save'. At the user's desktop machine, the user views a window which contains information temporarily stored locally within the client computer for use by a script application. Not all of the information stored for the script application is necessarily visible on the display at any one time, and scroll bars are provided to permit the user to view information stored but not currently visible. The data shown on the client computer screen may be a representation of a planning cube (or data cube) that is a subset of the Planning Data Repository data. In a further embodiment of the invention the user is able to change the various relationships amongst the data and these alterations sent to the PDR for computation.

16 Claims, 3 Drawing Sheets

USER INTERFACE FOR A MULTI-DIMENSIONAL DATA STORE

The invention is practiced in the domain of databases, multi-dimensional data stores, or data warehouses, and in particular in the application of those databases, multi-dimensional data stores, or data warehouses to business planning and forecasting processes in client/server or equivalent environments.

BACKGROUND

Since their invention and widespread availability, spreadsheets have provided business managers with a powerful tool to use during forecasting and planning.

Data warehouses and other repositories of large amounts of data in the form of multi-dimensional data stores are more and more a feature of business and electronic commerce, especially in enterprise-wide situations. The potential for improving business processes is large, and many tools are becoming available to assist the managers in their quest for improving forecasts. Many such tools extract data from the database or data warehouse and permit the manager to manipulate that data to perform 'what-if' operations which in turn allow the manager to explore a large number of scenarios.

An information platform carries out the following major functions, among others:

Collects and integrates data, observations and intelligence in a data warehouse;

Provides controls for multiple methods of information navigation and analysis;

Allows details to be digested in the context of other data, regardless of its type.

An information platform may be implemented as a client/server system having the following four major functions.

Data gathering: The entire information platform relies upon reliable, predictable access to data, regardless of data source. The data retrieval section of the platform provides a sophisticated source of internal business information. The information platform provides users with multiple ways for collecting vast amounts and varied types of information in the shortest time possible.

Data Storage: The second section of the application platform handles the storage of the information once it has been gathered from a source. The information store uses a database (which may be object-oriented or relational) and is effectively a data warehouse. The data in the repository or warehouse are normally static, but in some instances, dynamic or volatile data may be present. This planning database which we term a planning data repository (PDR) includes the ability to change and manipulate the data, compared to the relative stability of the data in a traditional data warehouse. Both exhibit the same flexible access behaviours, i.e. users can navigate the data and find information using a variety of navigation mechanisms as described in the next section.

Information Browsing, Query, Analysis, and Report Creation: A user can peruse and analyze information contained in the PDR. The user can also make changes to some of the forecast data, and a calculation engine ensures that the changes are consistent with other data. Reports can be generated on various data.

Desktop Integration: Typically the users access the PDR from client computers in the client/server environment. These client computers might include special client applications, or they might take advantage of the latest web browser technologies to provide ubiquitous and universal access.

Electronic spreadsheets are well-known in the art and implementations having the ability to deal with thousands or even millions of cells are not uncommon. Spreadsheet programs allow users to perform "what-if" scenarios. After a set of computational relationships has been entered into a worksheet, the spread of information can be recalculated using different sets of assumptions, with the results of each recalculation appearing almost instantaneously.

It is simple and understood in the art to create a conventional spreadsheet program written in a browser scripting language, of which JavaScript is a well-known example, which can be interpreted by many standard browsers, Netscape™ and Microsoft Internet Explorer™ being typical. Such scripting languages are used to build upon and extend the capabilities of Hyper-Text Markup Language (HTML).

Further, the use of spreadsheets to interact with data from a data warehouse in a limited way is well-known and understood in the art. In such implementations, the data selected by the user is downloaded from the data warehouse (in a quasi batch-mode operation) and 'loaded' into the spreadsheet where the various formulae and functions are applied, and the results displayed for the user.

It is also known for some spreadsheet and spreadsheet-like programs to communicate with external programs and data. Such programs can, for example, export "live" data from a worksheet to a document created in a word processing program. If the data in the worksheet changes, it changes in the document as well. Similarly, a worksheet may import "live" data obtained from an external database through inter-process communication. If the data in the database changes, the change will appear in the worksheet. These links between the spreadsheet and external programs are one-way: data is either sent to the external program or received from it, but not both. In all cases, the calculations are limited to those capable of completion using only the data copied and stored locally by the spreadsheet program, without continuing reference to an underlying data repository.

Other products based on spreadsheets with separate computation capabilities have been described (e.g. U.S. Pat. No. 5,893,123 "System and method of integrating a spreadsheet and external program having output data calculated automatically in response to input data from the spreadsheet"), where both the nature of the underlying data and computation capability are considerably different from this invention. In the case of the '123 patent, the underlying data and the computation capability are contained in an electronic circuit simulator.

There exist products which are very similar in appearance to typical spreadsheet programs, but again they lack full integration with any underlying centralized data store. One such product, BrainMatter[1] by "AlphaBlox" is a spreadsheet application written entirely in JavaScript[2] and Hyper-Text Markup Language (D-HTML).

[1]TM of AlphaBlox
[2]Registered trademark of Sun Microsystems

Gedafe (Generic Database Front-End) from Departement für Elektrotechnik, ETZ Zürich (http://www.isg.ee.ethz.ch/tools/gedafe/index.en.html) is a web-based database front-end that is database-application independent. The application code does not contain any information about what tables are present in the database or how the data is organized. This product relies on a full-featured SQL database server which permits definition not only of the format of the various tables and fields, but also of how tables are related to each other. These features allow the implementation of data integrity constraints inside the database itself so that the database server itself guarantees the integrity of the database, independently from the software used to access the database. Although such a front-end might read all the integrity constraints directly off the database and enforce them itself in order to provide faster response to the user, at the end of the day the database server will only accept data which follow the rules defined by the database programmer. Data integrity is enforced for all possible interactions with the database short of manipulation of the database structure and rules themselves, but it imposes a large load on the database server during insert and update operations. However, Gedafe is limited to maintaining database constraints that can be defined in SQL, such as foreign keys and min/max values. Further, specific application software is required at the client.

Despite the obvious benefits of programs such as BrainMatter and Gedafe, they have limitations in their ability to deal with large data warehouses or Planning Data Repositories, and do not take full advantage of the possibilities provided by the ability of multiple users accessing the data, more or less simultaneously.

What is needed is a means of overcoming the limitations of existing client applications. Such improvements would allow better use of the underlying data and other information stored in a Planning Data Repository or similar facility.

SUMMARY OF THE INVENTION

Existing client applications are limited in terms of their complexity, ability to permit geographically dispersed users interact with the same database while maintaining the overall integrity of the data. Specifically, programs such as BrainMatter are limited in their ability to ensure that the data changes made by a user at the client are fully 'compatible' and consistent with the other data within the underlying database. The invention seeks to overcome these and other limitations. In doing so, it proved highly desirable and efficacious to create a two-way linkage between the client computer and the multi-dimensional database with its associated processor(s), so that the associated processor(s) can receive input data from one or more cells displayed by the spreadsheet-like program, manipulate the data within the context of the database so that it is consistent, and produce output data, based upon the input data, to be displayed in another one or more cells of the spreadsheet-like program.

In an environment consisting of a client personal computer running various applications, a communications path or network (typically an intranet or the Internet/World Wide Web), a server computer (or computer complex), also running applications, obtaining data from a planning data repository or data warehouse, itself a computer complex with large storage capacity, what is needed is the ability to allow the data displayed by the spreadsheet-like program to be updated once it has been checked for consistency in the planning data repository.

The invention ensures consistency in the underlying data in a conceptually simple manner.

The invention also has the advantage of not depending on the computing platform used by the client. Rather than compete with major desktop analysis and reporting tools, the invention makes use of generic workstations equipped with industry-standard browser software which is capable of running client-side scripts. In other words, no special hardware or software is required at the client.

One of the underlying concepts is to make use of the powerful functions or operations provided by a suitable calculation engine (of which the co-pending application—our ref. 08886651—is an example), in collaboration with a planning data repository. The size and relative complexity of systems using data warehouse techniques, which are required for a planning data repository, means that earlier approaches involving copying data into the client, changing part of that data, computing the related updates, and confirming their consistency across the database, are not feasible.

The invention consists of a spreadsheet-like program—the client application—written in a browser scripting language, of which JavaScript is but one well-known example, which can be interpreted by many standard browsers, including Netscape Navigator[3] version 2.0 and later, Microsoft Internet Explorer[4] version 3.0 and later, and Opera version 3.0 and later. This client application interacts, possibly remotely over a network like the Internet, with a planning data repository and its associated computing resources.

[3]Registered trademark of Netscape Communications Corporation.
[4]Registered trademark of Microsoft Corporation While the client application has all the appearance of a conventional spreadsheet, the invention takes a somewhat different approach than that used in the normal storage and calculation functions of a spreadsheet. In the invention, all of the data used in computing the values shown in the spreadsheet cells are derived directly from a planning data repository (PDR) or data warehouse. Any changes made by the user to the displayed data are sent to the PDR and, when validated, incorporated into the overall data following a two-step process of 'calculate' and 'save'.

Thus much of the underlying functionality of the invention resides in the PDR and its associated processor(s). At the user's desktop machine (the client computer), the user views a window which contains information temporarily stored locally within the client computer for use by a script application. Not all of the information stored for the script application is necessarily visible on the display at any one time, and scroll bars are provided to permit the user to view information stored but not currently visible.

In some cases the data, which might otherwise be changed by the user or during processing, is locked to prevent such changes.

In one embodiment of the invention, the data shown on the client computer screen is a representation of a planning cube (or data cube) that is a subset of the Planning Data Repository data.

In a further embodiment of the invention, as with conventional spreadsheets, the user is able to change the various relationships amongst the data—in other words, the formulae relating the data may be altered. These alterations are sent to the PDR for computation, since the ability of a client work-station to handle the data and computations is limited.

In a still further embodiment of the invention, following the completion of calculation, only changed data are resent by the PDR or database server to the client, thereby saving bandwidth and/or processing capability.

The invention provides a means of interacting with a subset of a large amount of related information that assists in providing a user with the overall understanding necessary to execute rapid and knowledgeable decision-making, especially in business planning and forecasting. The information is accessed through a combination of desktop and server technologies that raise the decision-making abilities of business professionals to the highest possible level.

In contrast to the present invention, the previously mentioned U.S. Pat. No. 5,893,123, "System and method of integrating a spreadsheet and external program having output data calculated automatically in response to input data from the spreadsheet", describes a spreadsheet program which is dependent on a database to provide the data. However, part or all of the processing is carried out in the spreadsheet application, rather than at the database. Also the nature of the data being processed is very different, with the present invention dealing with enterprise data and the prior art patent being related to circuit design and similar fields in which the data and their relationships are significantly less complex and extensive. In addition, the prior art describes the integration of data with an existing spreadsheet through the addition of processing modules. The present invention is a separate application, implemented as a client-side script and running in a web browser using industry standard facilities.

BRIEF DESCRIPTION OF THE DRAWINGS

The preferred embodiment will now be described with reference to the following figures.

DETAILED DESCRIPTION

Figure 1:
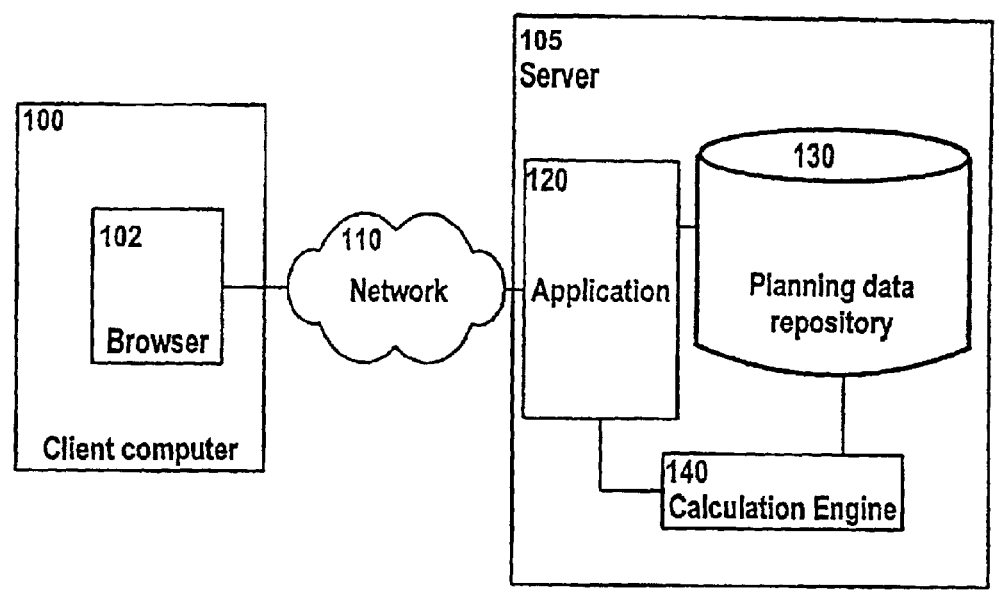
FIG. 1 depicts a planning data repository connected over a 'network' such as the internet to a client.

Referring first to FIG. 1, wherein is shown a client computer 100 using a web browser 102, connected over a network 110 to a Server 105 containing a Planning Data Repository (PDR) 130 which has associated with it a Calculation Engine 140 and an application process or Server 120. When the client computer has established a logical connection to the PDR and associated software resources, information or data stored within the PDR is sent to the client computer, together with metadata describing that data.

Metadata is information (or data) about data. Simple examples of metadata collected for a data warehouse may pertain to:

the data structure or schema data warehouse table attributes and structures.

mapping from the operational database to the data warehouse the meaning of, or an interpretation of, the data for a business objective.

Access metadata is the dynamic link between the data warehouse and end-user applications. It generally contains the enterprise measures supported by the data warehouse and a dictionary of standard terms including user-defined custom names and aliases. Access metadata also includes the location and description of data warehouse servers, databases, tables, detailed data, and summaries along with descriptions of original data sources and transformations. Access metadata provides rules for drill up, drill down and views across enterprise dimensions and subject hierarchies like products, markets, and customers. Access metadata also allows rules for user-defined custom calculations and queries to be included. In addition, access metadata contains individual, work group, and enterprise security for viewing, changing, and distributing custom calculations, summaries, or other analyses.

Not all of the metadata is used or relevant to this invention. In particular neither the metadata relating to the data warehouse structure, nor the mapping between the data warehouse and the operational database are of immediate or direct interest to the user. The metadata used in the invention only describes the cube itself (dimensions and members). The actual layout of the underlying database(s) is abstracted away by the relevant Application Programming Interfaces.

Figure 2:
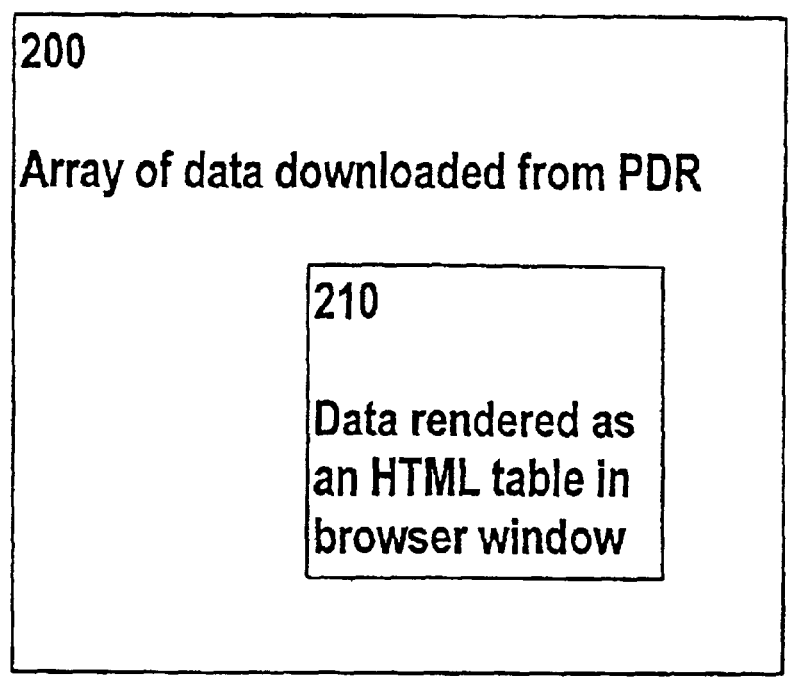
FIG. 2 is a representation of the way the client works, windowing over a set of data values from the planning data repository.

The data, together with relevant descriptors or labels derived from the metadata, can be displayed in a suitable multi-dimensional representation of that data, typically as a number of two-dimensional tables. Since the number of data points of interest to the user, despite being a subset of the data within the PDR, may still exceed the physical ability of the display mechanism to be shown clearly, a 'windowing' mechanism may be provided as illustrated in FIG. 2, which shows an array of data 200 downloaded from the Planning Data Repository, and a smaller portion 210 of it as being rendered on the display of the users terminal, in this case using HTML, but which generally could be any suitable windowing software. The displayed window might include scroll-bars and other features typically used in such interfaces. For example, the visible window may be implemented as an HTML table within the browser, with areas along the lower and right sides denoted as scroll bars, with an appropriate script (or program) running within the browser which causes the HTML table to be re-rendered as necessary as the user scrolls over the array.

Figure 3:
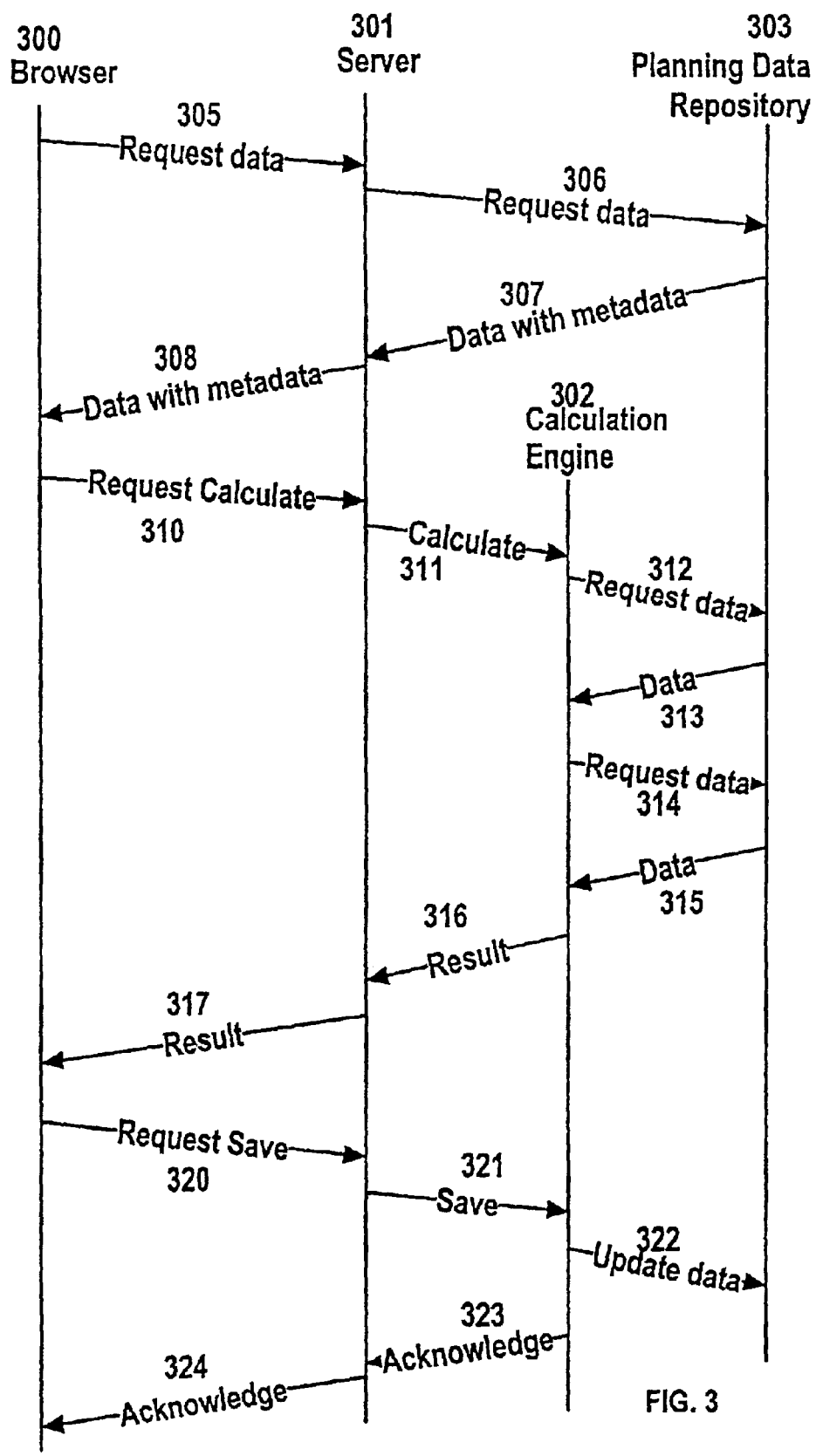
FIG. 3 is a message flow diagram showing the steps involved in changing data at the client, performing calculations, and propagating changes to both the end user and the multi-dimensional data store.

Referring now to FIG. 3, a message flow of the interaction between various elements of the system, namely the Browser 300, the Server 301, the Calculation Engine (CE) 302 and the Planning Data Repository (PDR) 303. Initially, the browser 300 requests certain data from the PDR. A message 305 to this effect is sent by the client 300 to the server 301, which in turn sends a request for data 306 in the format appropriate to the planning data repository 303. The appropriate data and metadata 307 are then sent from the PDR 303 to the server 301 and thence to the browser 300 in a further message 308 that uses a format appropriate to the browser 308. The user, having examined the data from the PDR, is able to change some (potentially any) of the values presented on the display. When the user has decided that the changes reflect the situation they wish to examine, the Browser sends the resultant changed values with a Request Calculation 310 to the server application software—the 'Calculate' step. The server in turn formats a message 311 to the Calculation Engine 302. A series of iterative steps 312, 313, 314, 315 involving the PDR 303 and the Calculation Engine 302 are performed to ensure that the changes requested are self-consistent and also consistent with the other data stored in the PDR.

The Calculation Engine, described in more detail in a co-pending patent (Our ref 08-886651), is able to deal with complex planning calculations based on data warehouse or Planning Data Repository (PDR) data where some aggregated data or forecast data might be changed without directly manipulating the underlying data, and where there may be several relationships linking the data.

In considering the various formulae and functions describing these relationships, the Calculation Engine is also able to deal with complex relationships along more than one axis or dimension. A number of iterations are typically used involving both back-solving and 'forward-solving'. These relationships may be arbitrarily complex.

The advantage of the Calculation Engine described here lies in the ability to identify, before a step of back-solving and/or forward-solving, the subset of cells that needs to be recalculated. This is done using parent/child tables which simply identify and record the fact that the value in a particular cell depends on a value in one or more other cells. Once such parent/child tables exist, it is much simpler and faster to scan these tables looking for potential dependencies than to look at the actual formulae or functions relating the cells. The result is that there is the potential for huge savings in computing resources required to reach a solution in those situations where the cubes are very large, since in general, the number of cells actually affected by a given set of relationships is much smaller than the number of cells in the cube. In practical terms, the expected savings are yielded, although in some extreme and rare cases where a change needs to be propagated throughout the entire cube, and the savings may not be as large.

In general, for large complex cubes, the step of creating the parent/child tables is carried out in advance of the actual calculation by parsing all the relationships (formulae and functions) and summarising the dependencies between cells in parent/child tables.

For each rule (equation/function) or relationship the Calculation Engine completes an 'inverse back-solve' for each cell of data affected by the rule in question.

Once the calculations have been completed, and a consistent result 316 achieved by the calculation engine 302, the new data are sent 317 to the browser 300 from the server 301, accompanied by the relevant metadata. Note that no changes are made to the data within the PDR.

After the user has reviewed the changes, and possibly made other changes, including in some cases the removal of previous changes using an 'undo' function, the user can submit the new set of data to the PDR for a further consistency check, repeating the sequence starting with message 310 and ending with message 317.

Finally, where the data have been reviewed and are consistent, and the user is satisfied, the user can request that the changes be incorporated in the PDR, the 'Save' step. This is achieved by the Browser 300 sending a 'request save' message 320 to the server 301, which in turn issues a 'save' message 321 to the Calculation Engine which in its turn saves the updated data 322 in the Planning Data Repository 303. On completion of the updating of the data the Calculation Engine 302 sends an 'acknowledge' message 323 to the Server which sends an equivalent 'acknowledge' message 324 to the browser 300.

In cases where the requested changes are inconsistent, (or not permitted), no related changes are made and the inconsistent data are flagged to the user (for example by colour-coded changes in the displayed data, e.g., red for inconsistent data, orange for out-of-range data.)

The above description of a preferred embodiment of the invention is presented for the purposes of illustration and description. It is not intended to limit the invention to the precise form disclosed or to be exhaustive. Those skilled in the art will recognize that many modifications and variations are possible in light of the above teaching. It is intended that the scope of the invention be limited not by this detailed description, but rather by the claims appended hereto.

What is claimed is:

1. A system for enforcing data integrity during editing of a multi-dimensional data store comprising:
   a server facility further comprising an application program, and a multi-dimensional data store in the form of a planning data repository with an associated calculation engine capable of both back-solving and forward-solving;
   a client computer further comprising an application having the ability to show data derived from said database, and to request changes to the data to be made at said database; and
   a network interconnecting the server and the client.

2. The system of claim 1 wherein the Calculation Engine and Planning Data Repository ensure consistency and validity of changes in the data requested by the client application.

3. The system of claim 2 wherein the client application includes the ability to window over more data than is physically displayed.

4. The system of claim 3 wherein the calculation engine and Planning Data Repository are able to reverse previous changes completely—an Undo function.

5. The system of claim 4 wherein the data are displayed with dimensions derived from metadata sent by the server and the planning data repository.

6. The system of claim 1 wherein only changes to the data are transferred from the server to the client.

7. The system of claim 1 wherein, following the receipt by the client of the possible formulae to be used in the calculations, the client signals to the server which of the said formulae are to be used.

8. The system of claim 7 where the client is permitted to edit said formulae and replace them with new formulae if required.

9. The system of claim 8 where the data are displayed in a fashion that simulates a standalone spreadsheet program.

10. The system of claim 9 wherein the network is the Internet or World Wide Web, and the Client software application is a standard Internet or Web Browser supporting JavaScript.

11. A method of enforcing data integrity during editing of a multi-dimensional data store in a system with a server operably coupled to a planning data repository, and a calculation engine capable of both back-solving and forward-solving, and a client computer containing a browser application, all interacting over one or more networks, the method comprising the steps of:
   a. providing a spreadsheet-like display containing data for use by said method;
   b. the browser obtaining data from the planning data repository;
   c. in response to a user action, the browser sending a "Request Calculate" to the server, the requested calculation requiring the calculation engine to use back-solving;
   d. the server obtaining from the calculation engine the result of the calculation;
   e. the server passing the result received from the calculation engine to the browser;
   f. the browser displaying the results of the changes;
   g. in response to a user action, she browser sending a "Request Save" to the server; and
   h. the browser receiving an Acknowledgement of a successful Save.

12. The method of claim 11 wherein the step of the Browser obtaining data from the Planning Data Repository comprises the following steps:
   a. the Browser requesting data from the Server;
   b. the Server requesting data from the Planning Data Repository;
   c. the Planning Data Repository responding to the request of step c from the Server with the data and metadata;
   d. to Server reformatting the data and metadata; and
   e. the Server responding to the request of step b with the data and metadata.

13. The method of claim 11 wherein the step of the server obtaining from the calculation engine the result of to calculation comprises the following steps:
   a. the server forwarding the "Request Calculate" message including changed data to a calculation engine, the requested calculation requiring the calculation engine to use back-solving;
   b. the calculation engine performing a series of Requests for data from the planning data repository;
   c. the calculation engine performing the required calculations using the changed data and the data requested from the planning data repository;
   d. the calculation engine ensuring that the appropriate data is compatible with the data and rules pertaining to the data as contained in the planning data repository; and
   e. the calculation engine forwarding the result of the calculation to the server.

14. The method of claim 11 wherein, following the step of in response to a user action, the Browser sending a "Request Save" to the Server, the following steps take place:
   a. the Server forwarding the "Request Save" message including changed data to a Calculation Engine;
   b. the Calculation Engine updating the Planning Data Repository with data changed as a result of the Request Calculation; and
   c. the Calculation Engine sending an "Acknowledge" message to the Server confirming successful completion of the "Request Save".

15. A method of enforcing data integrity during editing of a multi-dimensional data store in a system with a server operably coupled to a planning data repository, and a calculation engine capable of both back-solving and forward-solving, and a client computer containing a browser application, all interacting over one or more networks, the method comprising the steps of:
   a. providing a spreadsheet-like display containing data for use by said method;
   b. the browser requesting data from the server;
   c. the server requesting the data from the planning data repository;
   d. the planning data repository responding to the request of step c from the server with the data and metadata;
   e. the server reformatting the data and metadata;
   f. the server responding to the request of step b with the data and metadata;
   g. in response to a user action, the browser sending a "Request Calculate" to the server;
   h. the server forwarding the "Request Calculate" message including changed data to a calculation engine, the requested calculation requiring the calculation engine to use back-solving;
   i. the calculation engine performing a series of Requests for data from the planning data repository;
   j. the calculation engine performing the required calculations using the changed data and the data requested from the planning data repository;
   k. the calculation engine ensuring that the appropriate data is compatible with the data and rules pertaining to the data as contained in the planning data repository;
   l. the calculation engine forwarding the result of the calculation to the server;
   m. the server passing the result received from the calculation engine to the browser in the format required;
   n. the browser displaying the effect of the changes resulting from the calculation engine implementing the "Request Calculation" message;
   o. in response to a user action, the browser sending a "Request Save" to the server;
   p. the server forwarding the "Request Save" message including changed data to a calculation engine;
   q. the calculation engine updating the planning data repository with data changed as a result of the Request Calculation;
   r. the calculation engine sending an "Acknowledge" message to the server confirming successful completion of the "Request Save"; and
   s. the server forwarding the Acknowledgement of successful completion to the browser.

16. The method of claim 15 wherein the Planning Data Repository is distributed over a number of computers interconnected by a network.

* * * * *

UNITED STATES PATENT AND TRADEMARK OFFICE
CERTIFICATE OF CORRECTION

PATENT NO.   : 6,907,428 B2
DATED        : June 14, 2005
INVENTOR(S)  : Alexander G. Fitzpatrick and Sasan Seydnejad It is certified that error appears in the above-identified patent and that said Letters Patent is hereby corrected as shown below:

Column 8,
Line 52, "she" should read -- the --.
Line 65, "to" should read -- the --.

Column 9,
Line 2, "to" should read -- the --.

Signed and Sealed this

Twenty-eighth Day of February, 2006

JON W. DUDAS
*Director of the United States Patent and Trademark Office*